(12) United States Patent
Isoda

(10) Patent No.: US 8,292,520 B2
(45) Date of Patent: Oct. 23, 2012

(54) OPTICAL CONNECTOR

(75) Inventor: Takeshi Isoda, Yao (JP)

(73) Assignee: Hosiden Corporation, Osaka (JP)

( * ) Notice: Subject to any disclaimer, the term of this patent is extended or adjusted under 35 U.S.C. 154(b) by 378 days.

(21) Appl. No.: 12/644,010

(22) Filed: Dec. 22, 2009

(65) Prior Publication Data

US 2010/0158451 A1 Jun. 24, 2010

(30) Foreign Application Priority Data

Dec. 24, 2008 (JP) ................................. 2008-327221

(51) Int. Cl.
*G02B 6/36* (2006.01)
*G02B 6/42* (2006.01)
(52) U.S. Cl. ............................... 385/92; 385/88; 385/94
(58) Field of Classification Search .................. None
See application file for complete search history.

(56) References Cited

U.S. PATENT DOCUMENTS

| 5,802,230 | A * | 9/1998 | Kuribayashi et al. | ............ | 385/92 |
| 7,720,122 | B2 | 5/2010 | Matsushita et al. | | |
| 2006/0093288 | A1 * | 5/2006 | Mine et al. | ........................ | 385/92 |
| 2006/0274996 | A1 * | 12/2006 | Mine et al. | ....................... | 385/88 |

FOREIGN PATENT DOCUMENTS

| DE | 10 2006 005 070 | 8/2006 |
| EP | 1 510 843 | 3/2005 |
| EP | 1 659 432 | 5/2006 |
| JP | 2001-356250 | 12/2001 |
| JP | 2005-311239 | 11/2005 |
| JP | 2006-154788 | 6/2006 |
| WO | WO 2007/033611 | 3/2007 |

OTHER PUBLICATIONS

Most Informative, Issue 2, Mar. 2008, p. 17.
Extended European Search Report issued Mar. 15, 2010 for corresponding European patent application No. 09 015 731.4.
Office Action issued on Mar. 8, 2011 by the Japanese Patent Office for counterpart foreign patent application JP 2008-327221.

* cited by examiner

*Primary Examiner* — Michelle R Connelly
(74) *Attorney, Agent, or Firm* — David N. Lathrop

(57) ABSTRACT

A shield cover is provided with urging components that urge a light guide in the direction in which the light guide is inserted into a receptacle body to prevent the light guide from making contact with a light emitting element and a light receiving element when a receptacle body mates with a shield cover. Even if the light guide does not completely mate with the receptacle body, the urging components make contact with the light guide before the light guide makes contact with the light emitting element and the light receiving element so that an urging force by the urging components make the light guide completely mate with the receptacle body.

10 Claims, 11 Drawing Sheets

OPTICAL CONNECTOR

BACKGROUND OF THE INVENTION

1. Field of the Invention

The present invention relates to optical connectors for bidirectional optical communication that optically connect between an optical fiber and light emitting and light receiving elements.

2. Description of Related Art

The conventional optical connector shown in non-patent literature 1 will be described below in terms of its assembling method. First, a light guide 1 is inserted into a receptacle body 2 in the direction of arrow A1, as shown in FIG. 10. On the other hand, a light emitting element 3 and a light receiving element 4 are held in an element holder 5 and, as shown in FIG. 11, the element holder 5 is placed in a shield cover 6. The shield cover 6 has blade springs 6h and 6i (FIG. 12), which push the placed element holder 5 in the direction of arrow A2 (upward direction in FIG. 11 or leftward direction in FIG. 12).

Non-patent literature 1: page 17 in "MOST informative", MOST Cooperation, March 2008.

FIGS. 10, 11, 13, 15, and 16 are schematic diagrams illustrating conventional optical connectors, in which some parts are indicated simply. For example, unlike the actual shape shown in FIGS. 12 and 14, the blade springs 6h and 6i are indicated simply.

The receptacle body 2 slides in the direction opposite to that of arrow A2 with respect to the shield cover 6 as shown in FIG. 11 to mate with the shield cover 6 as shown in FIG. 13. During the sliding, projections 2d and 2e of the receptacle body 2 make contact with the light emitting element 3 and the light receiving element 4, respectively, and push the element holder 5 including the light emitting element 3 and the light receiving element 4 in the direction of arrow A3 (downward direction in FIG. 13 or rightward direction in FIG. 12). This pressing locates the light guide 1 in an appropriate position with respect to the light emitting element 3 and the light receiving element 4. FIG. 14 is an exploded perspective view of a conventional optical connector.

SUMMARY OF THE INVENTION

Problem to be Solved by the Invention

In the conventional optical connector described in non-patent document 1, however, there may be play between the light guide 1 and the receptacle body 2 after the receptacle body 2 mates with the shield cover 6. This play changes the gap between the light guide 1 and the light emitting element 3 and light receiving element 4 and changes the amount of light that leaks as a loss, possibly destabilizing the optical characteristics.

Means to Solve the Problems

To address the above problem, the present invention provides an urging means for urging the light guide in the direction in which the light guide is inserted into the receptacle body when the receptacle body has mated with the shield cover.

Effects of the Invention

The urging means urges the light guide in the direction in which the light guide is inserted into the receptacle body when the receptacle body has mated with the shield cover, so no play is generated between the light guide and receptacle body. Accordingly, the present invention has an effect of stabilizing the optical characteristics.

BEST MODES FOR CARRYING OUT THE INVENTION

Figure 1:
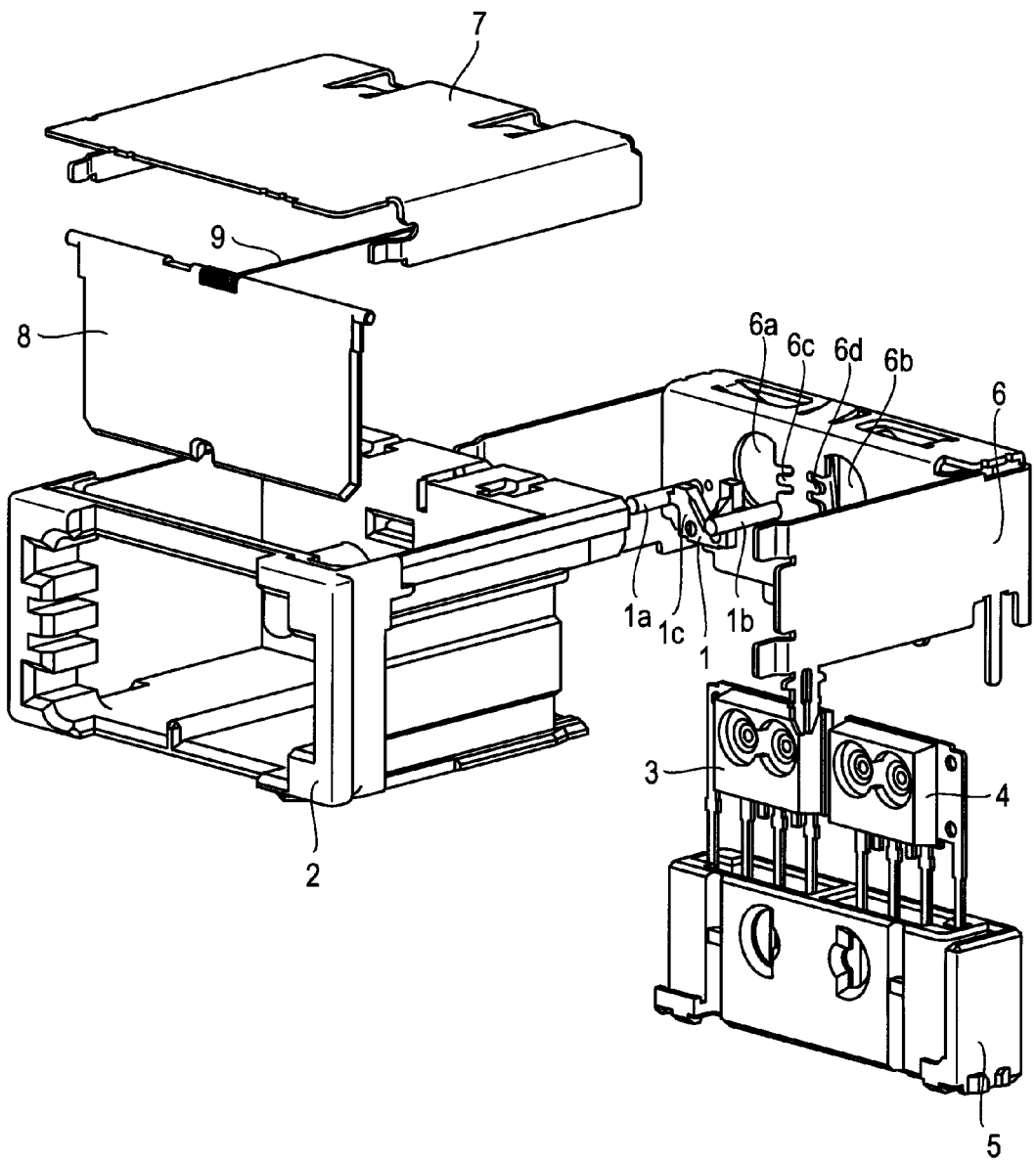
FIG. 1 is an exploded perspective view of an exemplary optical connector according to the present invention.
Figure 2:
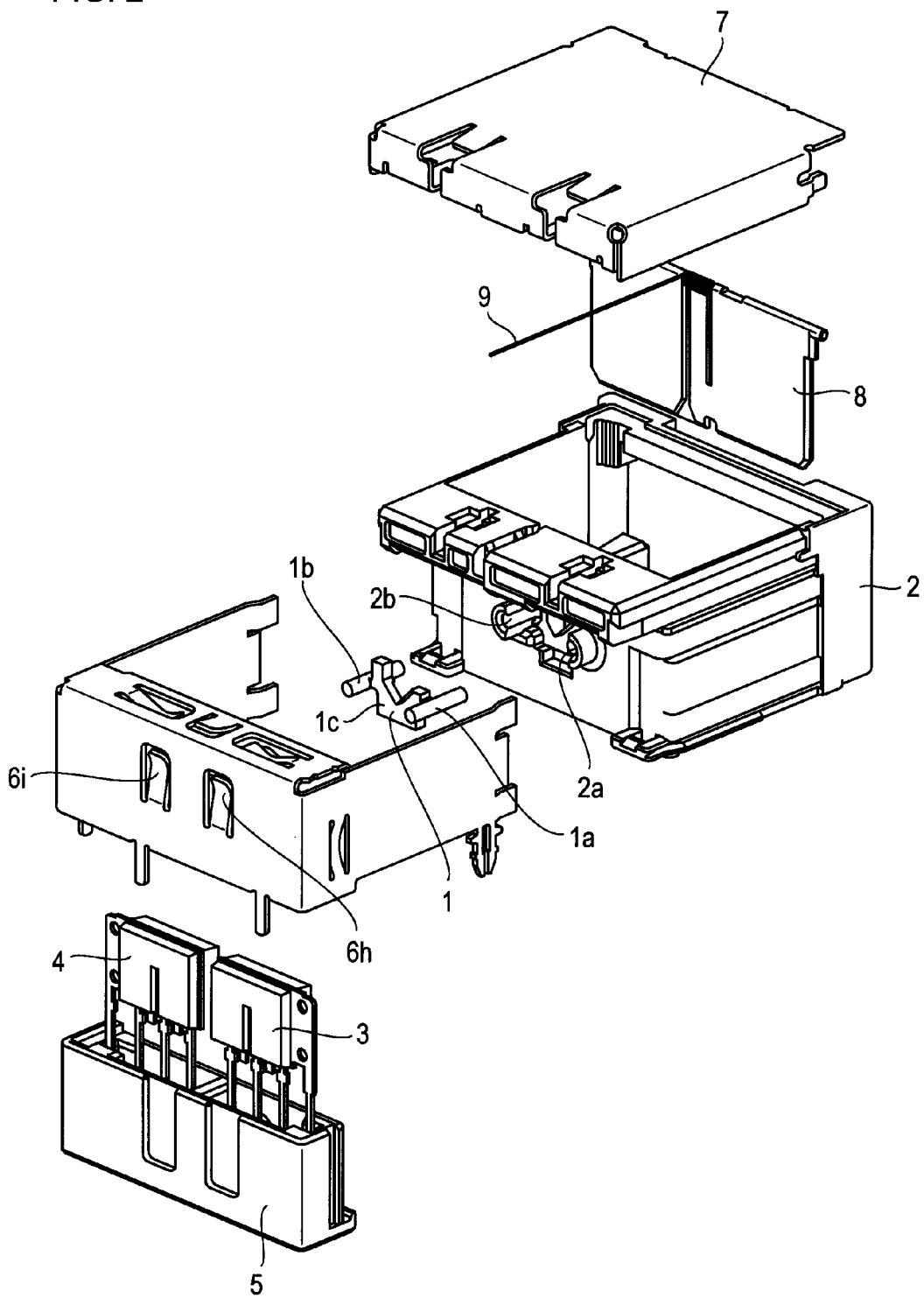
FIG. 2 is an exploded perspective view of the exemplary optical connector according to the present invention.

Embodiments of the present invention will be described below with reference to the drawings.

A light guide 1 has a sending side optically functional section 1a, which optically connects a light emitting element 3 and a transmission optical fiber, a receiving side optically functional section 1b, which optically connects a light receiving element 4 and a reception optical fiber, and a joint section 1c, which connects between the sending side optically functional section 1a and the receiving side optically functional section 1b. The sending side optically functional section 1a, the receiving side optically functional section 1b, and the joint section 1c are made of light-transmitting synthetic resin and molded integrally by injection molding.

The sending side optically functional section 1a and the receiving side optically functional section 1b are cylindrical. The joint section 1c is provided with a v-shaped groove for preventing light from leaking between the sending side optically functional section 1a and the receiving side optically functional section 1b. To prevent light from leaking between the sending side optically functional section 1a and the receiving side optically functional section 1b, the sending side optically functional section 1a and the receiving side optically functional section 1b are in contact with the joint section 1c so that the circumferential length of an area where the sending side optically functional section 1a and the receiving side optically functional section 1b are in contact with the joint section 1c becomes shorter than half of the outer circumferences of the sending side optically functional section 1a and the receiving side optically functional section 1b.

The light guide 1 is inserted into a receptacle body 2. That is, one end of the sending side optically functional section 1a and one end of the receiving side optically functional section 1b are inserted into holes 2a and 2b of the receptacle body 2, respectively. The diameters of the holes 2a and 2b are increased within the receptacle body 2 and a transmission optical fiber terminal (not shown) and a reception optical fiber terminal (not shown) are inserted into the section with the increased diameter.

The upper surface of the receptacle body 2 is covered with a cover 7. The cover 7 supports a shutter 8 in a rotatable manner. The shutter 8 is urged by a twisted coil spring 9 in the direction in which the shutter 8 is closed. Accordingly, if the transmission optical fiber terminal and the reception optical fiber terminal are not inserted into the receptacle body 2, the shutter 8 closes to prevent the entrance of foreign matter that may degrade the optical characteristics. If an attempt is made to insert the transmission optical fiber terminal and the reception optical fiber terminal into the receptacle body 2, the transmission optical fiber terminal and the reception optical fiber terminal make contact with the shutter 8 and pushes up the shutter 8. That is, the shutter 8 rotates in the direction in which the shutter 8 approaches the cover 7.

The light emitting element 3 and the light receiving element 4 are held in an element holder 5. The holder 5 is placed in a shield cover 6. The shield cover 6 has blade springs 6h and 6i, which press the placed element holder 5 in the downward direction in FIG. 3. In this way, the light emitting element 3 and the light receiving element 4 are held in the element holder 5, which is placed in the shield cover 6.

The shield cover 6 has openings 6a and 6b into which the sending side optically functional section 1a and the receiving side optically functional section 1b of the light guide 1 and projections 2d and 2e of the receptacle body 2 are inserted. Blade springs 6c and 6d, urging means, are provided between the openings 6a and 6d. In this example, the blade spring 6c and 6d are molded integrally with the shield cover 6. The blade spring 6c and 6d project from the inner surface of the shield cover 6 and extend toward the centers of the openings 6a and 6b, respectively.

The receptacle body 2 into which the light guide 1 is inserted slides to mate with the shield cover 6, which holds the light emitting element 3 and the light receiving element 4. When the receptacle body 2 has mated with the shield cover 6, an end 1d of the sending side optically functional section 1a and an end 1e of the receiving side optically functional section 1b of the light guide 1 face the light emitting element 3 and the light receiving element 4, respectively.

When the receptacle body 2 has mated with the shield cover 6, the blade spring 6c and 6d urge the light guide 1 in the direction in which the light guide 1 is inserted into the receptacle body 2. This prevents play between the light guide 1 and the receptacle body 2 from generating, thereby eliminating the looseness of the light guide 1.

Figure 15:
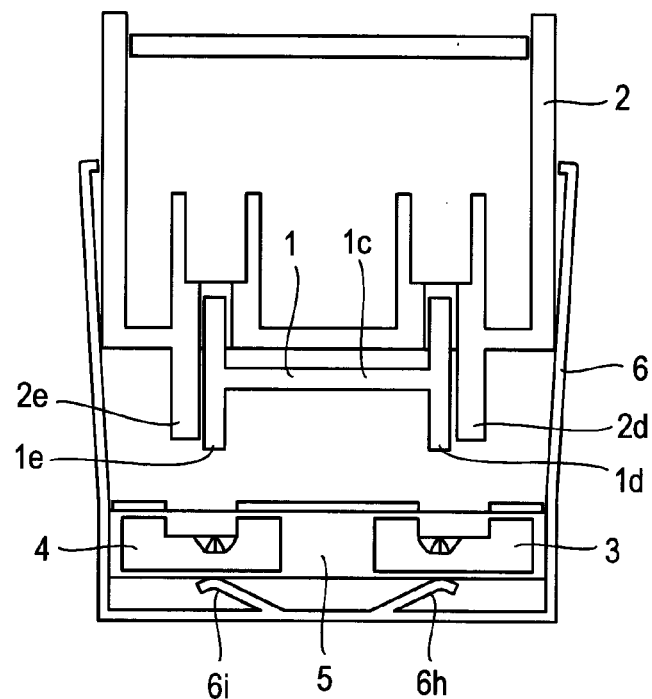
FIG. 15 is a diagram illustrating the conventional optical connector.
Figure 16:
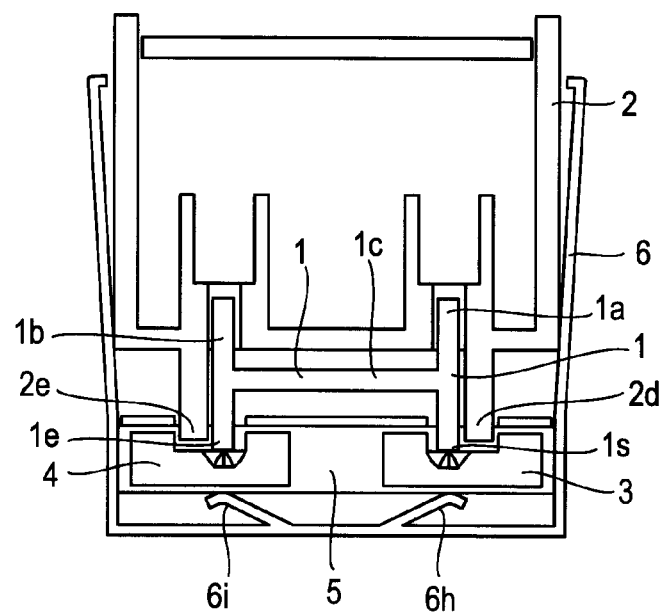
FIG. 16 is a diagram illustrating the conventional optical connector.

As shown in FIG. 15, the receptacle body 2 may not completely mate with the light guide 1 due to operation error or the like, so the ends 1d and 1e of the light guide 1 may project above the projections 2d and 2e of the receptacle body 2. In this case, if the blade springs 6c and 6d, the urging means, are not present, sliding the receptacle body 2 toward the shield cover 6 brings the end 1d of the sending side optically functional section 1a and the end 1e of the receiving side optically functional section 1b into contact with the light emitting element 3 and the light receiving element 4, respectively, before the projections 2d and 2e of the receptacle body 2 make contact with the light emitting element 3 and the light receiving element 4, respectively. This may scratch or dent the end 1d of the sending side optically functional section 1a, the end 1e of the receiving side optically functional section 1b, the light emitting element 3, and the light receiving element 4, possibly degrading the optical characteristics of the optical connector.

When the blade springs 6c and 6d project sufficiently above the inner surface 6e of the shield cover 6 (the amount of projection is described later), even if the light guide 1 is not completely inserted into the receptacle body 2 due to operation error or the like, sliding the receptacle body 2 toward the shield cover 6 brings the blade springs 6c and 6d into contact with the joint section 1c of the light guide 1 before the end 1d of the sending side optically functional section 1a and the end 1e of the receiving side optically functional section 1b make contact with the light emitting element 3 and the light receiving element 4, respectively, and the resulting elastic force inserts the light guide 1 into the receptacle body 2 completely. Accordingly, if the blade springs 6c and 6d project sufficiently above the inner surface 6e of the shield cover 6, it is possible to reduce the probability of degradation in the optical characteristics of the optical connector due to scratches and dents made in the end 1d of the sending side optically functional section 1a, the end 1e of the receiving side optically functional section 1b, the light emitting element 3, and the light receiving element 4 when the receptacle body 2 slides to mate with the shield cover 6.

Figure 5:
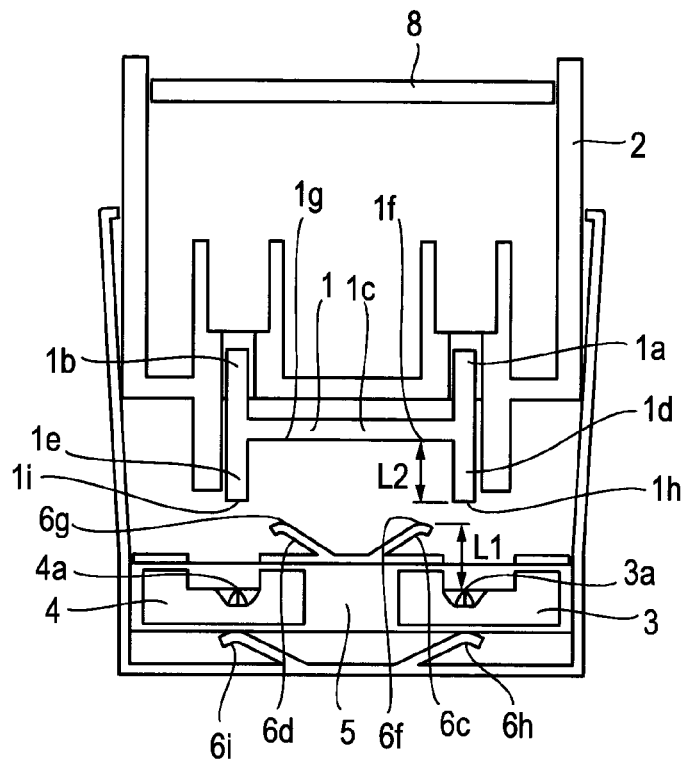
FIG. 5 is a diagram illustrating the lengths of blade springs 6c and 6d according to the present invention.

Referring to FIG. 5, the proper amount of projection of the blade springs 6c and 6d from the inner surface 6e of the shield cover 6 is described below. The light emitting element 3 portion that faces the end 1d of the sending side optically functional section 1a is assumed to be an area 3a; the light receiving element 4 portion that faces the end 1e of the receiving side optically functional section 1b is assumed to be an area 4a. The blade spring 6c portion that makes contact with the light guide 1 is assumed to be an area 6f; the blade spring 6d portion that makes contact with the light guide 1 is assumed to be an area 6g. The distance, in the direction in which the receptacle body 2 slides, between the area 3a and the area 6f and between the area 4a and the area 6g when the blade springs 6c and 6d are not in contact with the light guide 1 is assumed to be L1. The light guide 1 portion that makes contact with the blade spring 6c is assumed to be a point 1f; the light guide 1 portion that makes contact with the blade spring 6d is assumed to be a point 1g. The end face of the end 1d of the sending side optically functional section 1a is assumed to be 1h; the end face of the end 1e of the sending side optically functional section 1b is assumed to be 1i. The distance between the area 1f and the end face 1h and the distance between the area 1h and the end face 1i are assumed to be L2.

If the blade spring 6c and 6d project from the inner surface 6e of the shield cover 6 so that L1 becomes greater than L2, it is possible to reduce the probability of degradation in the optical characteristics of the optical connector due to scratches and dents made in the end 1d of the sending side optically functional section 1a, the end 1e of the receiving side optically functional section 1b, the light emitting element 3, and the light receiving element 4 when the receptacle body 2 slides to mate with the shield cover 6.

When the receptacle body 2 has mated with the shield cover 6, the blade springs 6c and 6d urge the light guide 1 in the direction in which the sending side optically functional section 1a and the receiving side optically functional section 1b move away from the light emitting element 3 and the light receiving element 4, respectively. That is, the blade spring 6c urges the light guide 1 in the direction in which the sending side optically functional section 1a moves away from the light emitting element 3 and the blade spring 6d urges the light guide 1 in the direction in which the receiving side optically functional section 1b moves away from the light receiving element 4. As described above, if the urging means for urging the light guide 1 in the direction in which the sending side optically functional section 1a and the receiving side optically functional section 1b move away from the light emitting element 3 and the light receiving element 4, respectively, it is possible to effectively prevent the sending side optically functional section 1a and the receiving side optically functional section 1b from making contact with the light emitting element 3 and the light receiving element 4, respectively. It is also possible to effectively prevent the gap between the sending side optically functional section 1a and the light emitting element 3 and the gap between the receiving side optically functional section 1b and the light receiving element 4 from varying.

Figure 3:
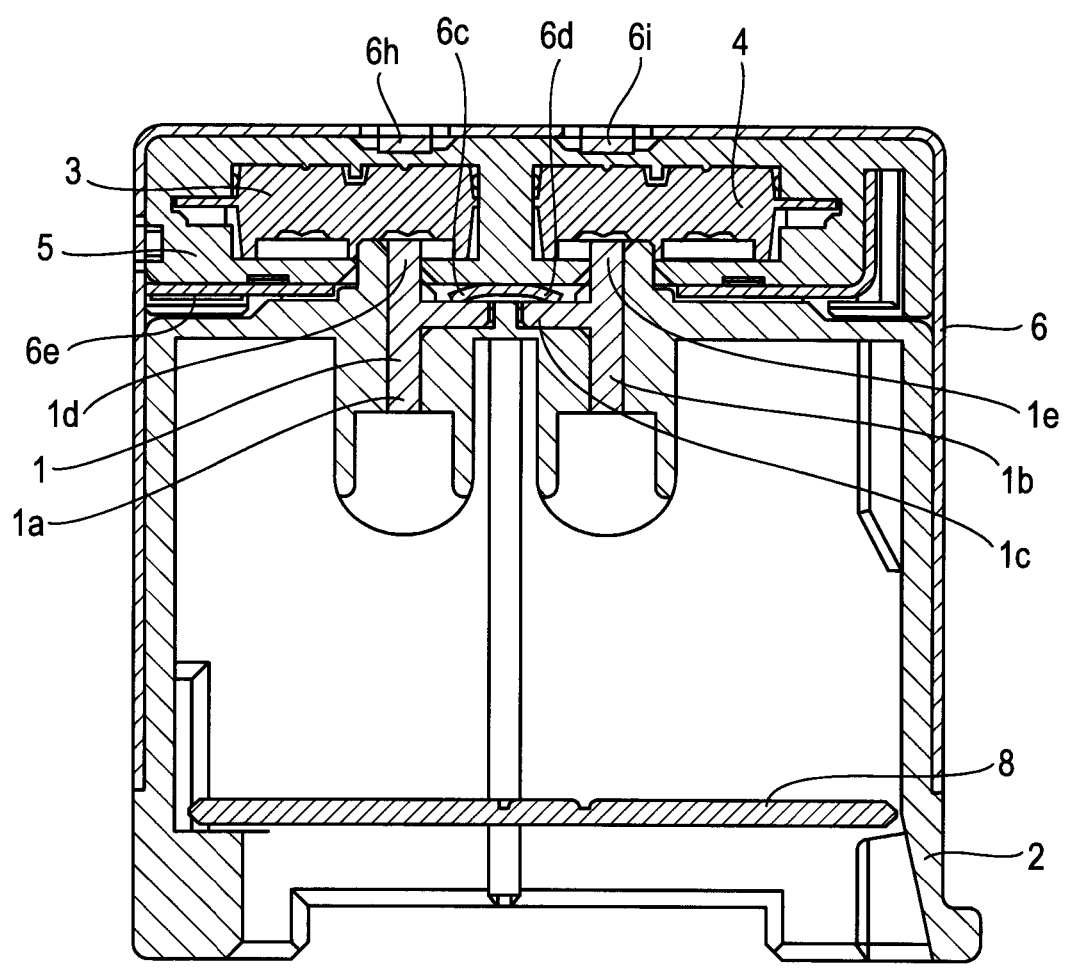
FIG. 3 is a cross-sectional view of the exemplary optical connector according to the present invention.
Figure 4:
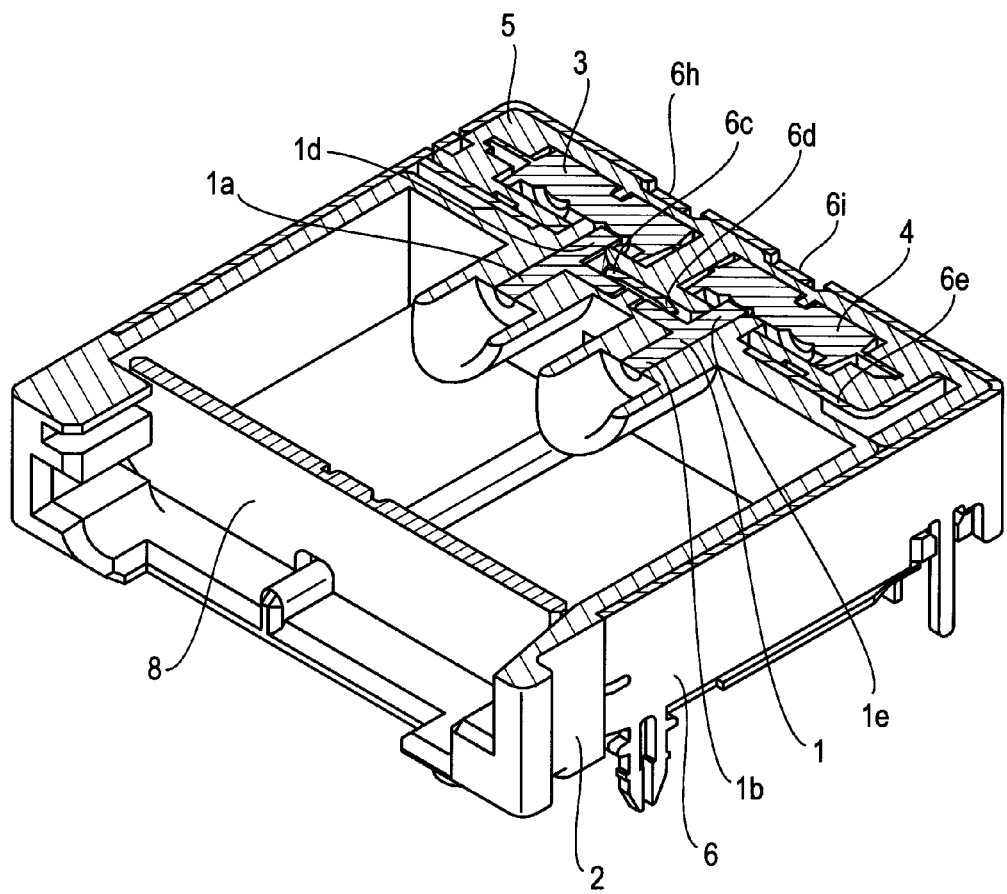
FIG. 4 is a cross-sectional perspective view of the exemplary optical connector according to the present invention.
Figure 6:
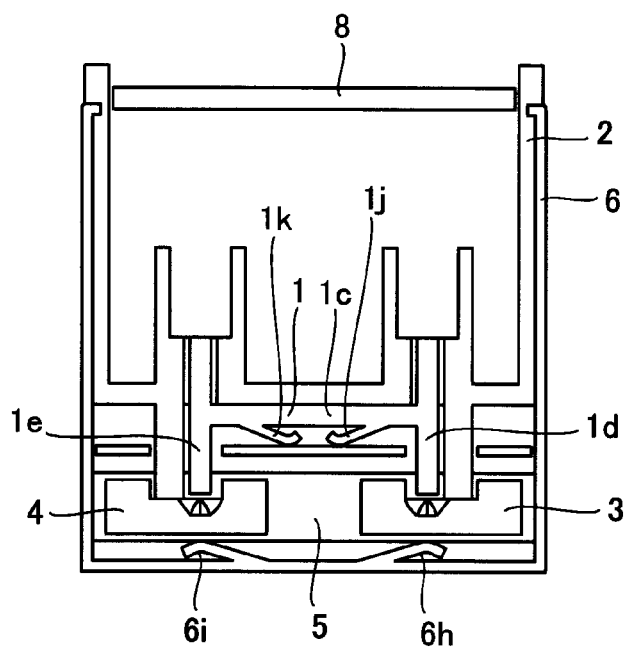
FIG. 6 is a schematic diagram illustrating an exemplary urging means according to the present invention.
Figure 7:
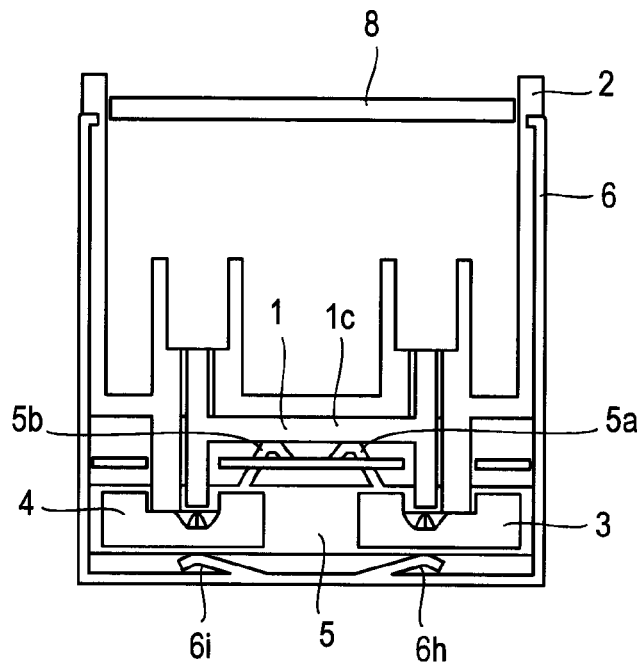
FIG. 7 is a schematic diagram illustrating an exemplary urging means according to the present invention.
Figure 8:
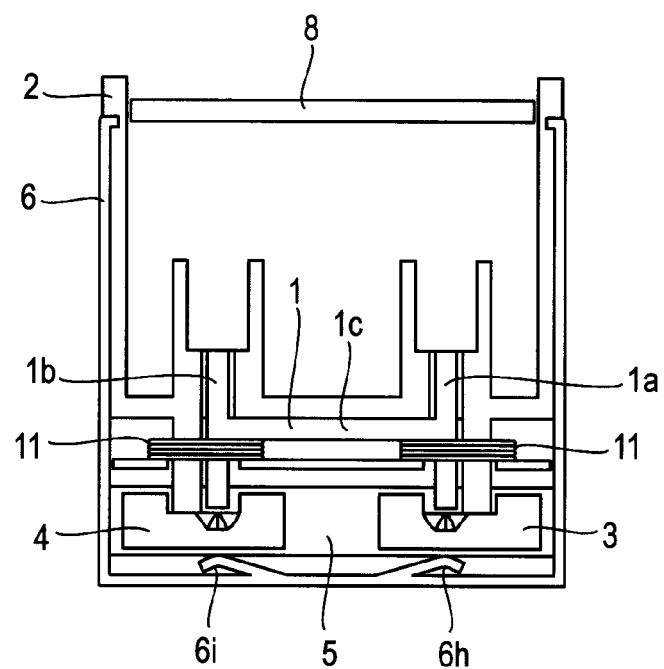
FIG. 8 is a schematic diagram illustrating an exemplary urging means according to the present invention.
Figure 9:
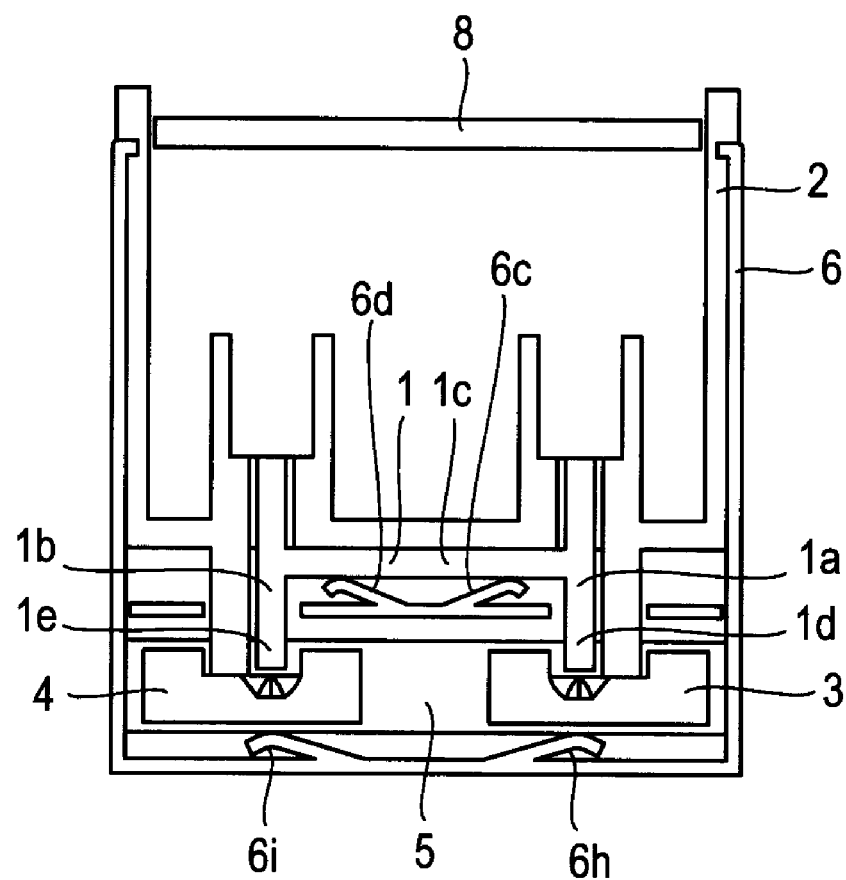
FIG. 9 is a schematic diagram illustrating an exemplary urging means according to the present invention.
Figure 10:
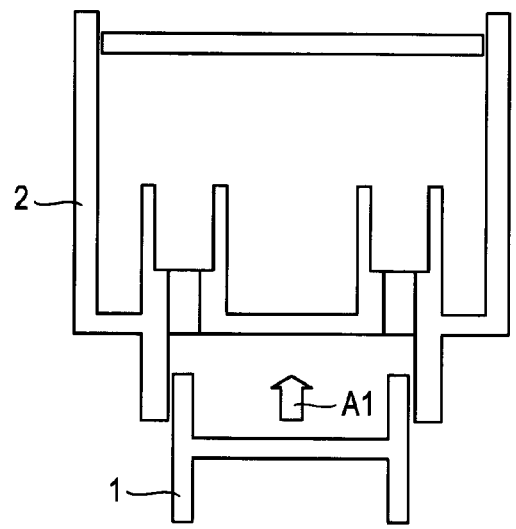
FIG. 10 is a diagram illustrating a conventional optical connector.
Figure 11:
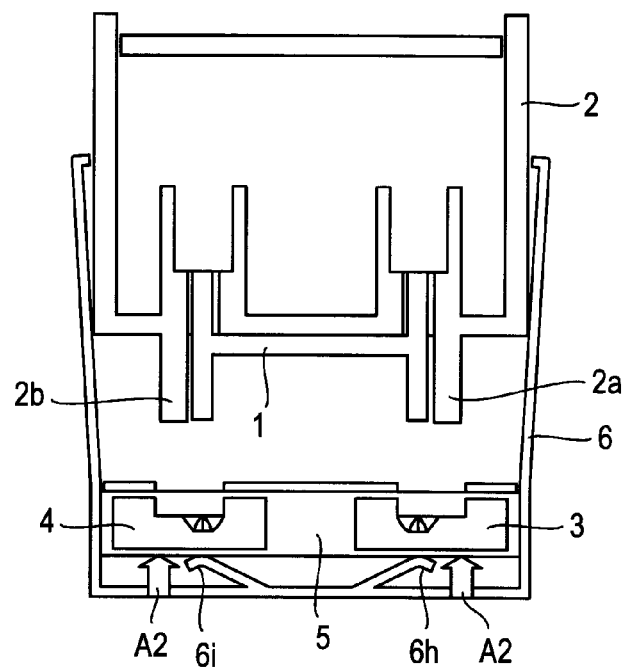
FIG. 11 is a diagram illustrating the conventional optical connector.
Figure 12:
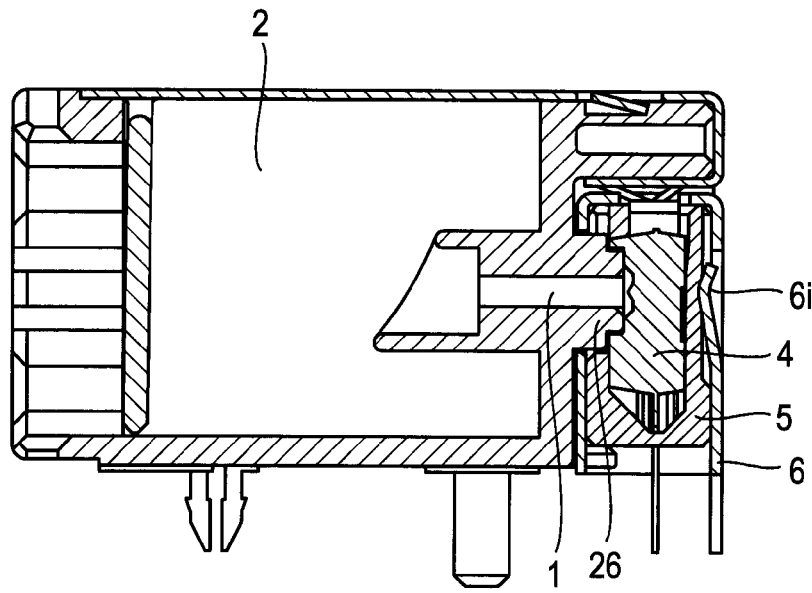
FIG. 12 is a cross-sectional view of the conventional optical connector.
Figure 13:
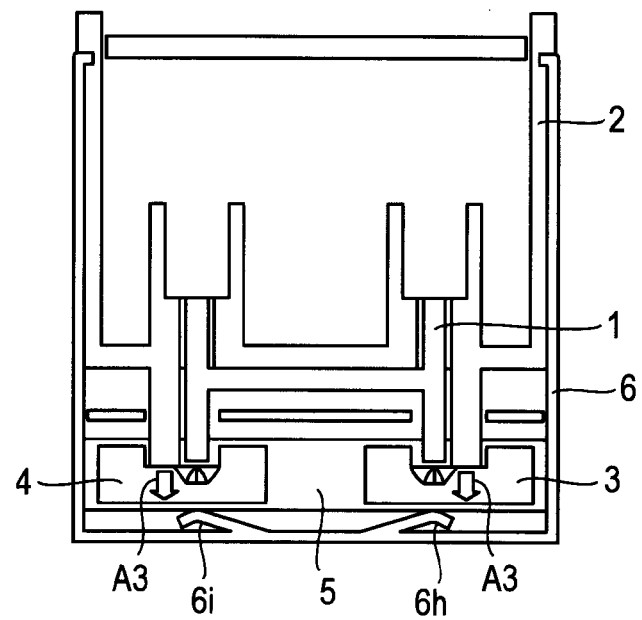
FIG. 13 is a diagram illustrating the conventional optical connector.
Figure 14:
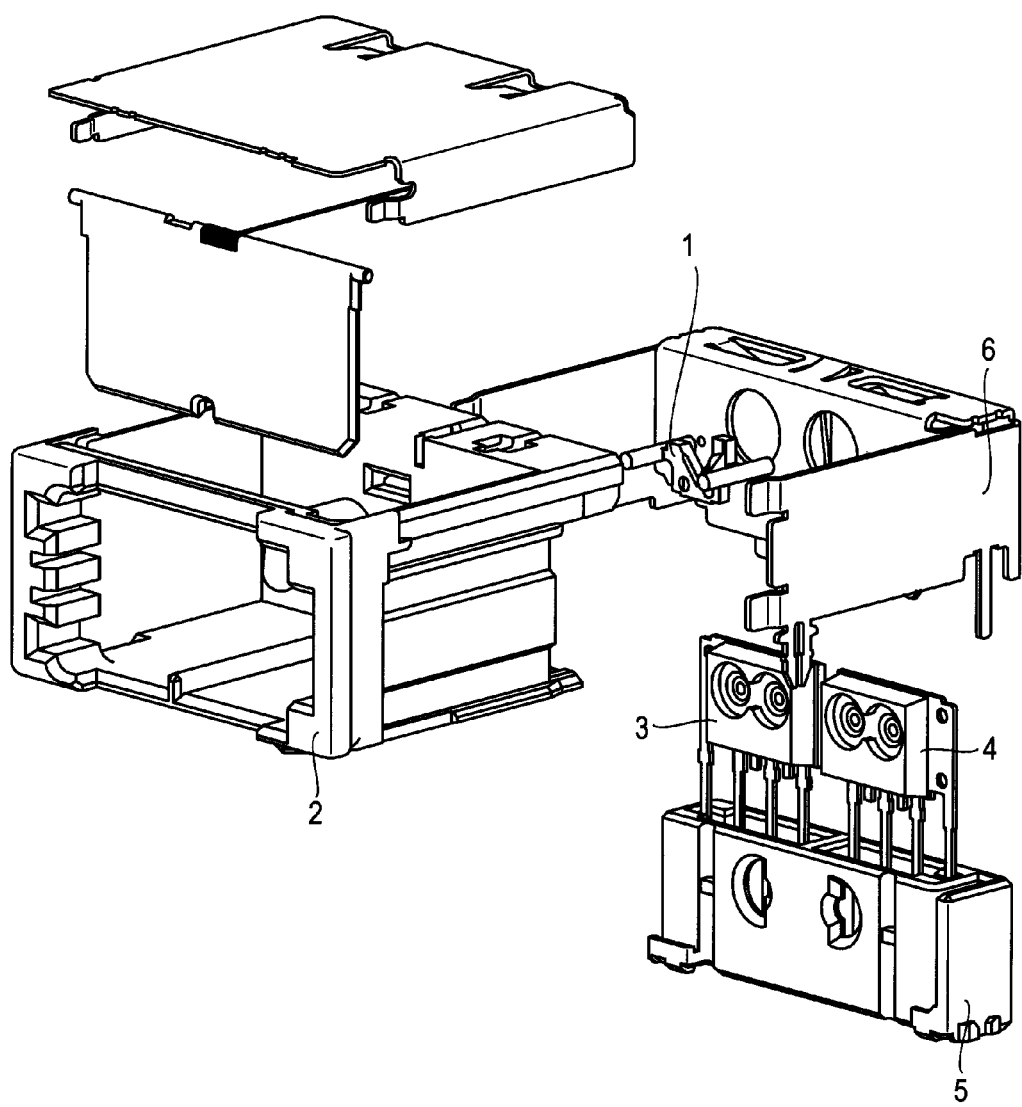
FIG. 14 is an exploded perspective view of the conventional optical connector.

These urging means are not limited to the blade springs 6c and 6d illustrated schematically in FIGS. 3, 4, and 9. As illustrated schematically in FIG. 6, blade springs 1j and 1k, which are the urging means, can be molded integrally with the light guide 1. As illustrated schematically in FIG. 7, blade springs 5a and 5b, which are the urging means, can be molded integrally with the element holder 5. In this case, the blade springs 5a and 5b pass through through-holes (not shown) formed in the shield cover 6 and make contact with the light guide 1. The urging means may be any elastic body other than blade springs and may be two coil springs 11 into which the sending side optically functional section 1a and the receiving side optically functional section 1b are inserted, as illustrated schematically in FIG. 8.

It will be appreciated that various modifications may be made as appropriate without departing from the scope of the invention.

The invention claimed is:

1. An optical connector comprising:
a shield cover holding a light emitting element and a light receiving element;
a light guide including a sending side optically functional section optically connecting the light emitting element and a transmission optical fiber and a receiving side optically functional section optically connecting the light receiving element and a reception optical fiber, the light guide being made of light-transmitting synthetic resin;
a receptacle body into which the light guide is inserted, the receptacle body being slidable with respect to the shield cover to mate with the shield cover; and
an urging means urging the light guide in a direction in which the light guide is inserted into the receptacle body when the receptacle body mates with the shield cover;
wherein an end of the sending side optically functional section faces the light emitting element and an end of the receiving side optically functional section of the light guide faces the light receiving element when the receptacle body has mated with the shield cover; and
wherein a distance, in the direction in which the receptacle body slides between a portion of the light emitting element and the light receiving element, which ends of the sending side optically functional section and the receiving side optically functional section respectively face, and a portion of the urging means that will contact with the light guide, when the urging means is not contact with the light guide, is greater than a distance, in the direction in which the receptacle body slides, between a portion of the light guide with which the urging means is to make contact and each of end faces of the ends of the sending side optically functional section and the receiving side optically functional section.

2. The optical connector of claim 1, wherein the urging means urges the light guide in a direction in which the sending side optically functional section and the receiving side optically functional section move away from the light emitting element and the light receiving element, respectively, when the receptacle body has mated with the shield cover.

3. The optical connector of claim 2, wherein the urging means is provided on the shield cover.

4. The optical connector of claim 2, wherein the light emitting element and the light receiving element are held in an element holder, the element holder being placed in the shield cover, and the urging means is provided on the element holder.

5. The optical connector of claim 2, wherein the urging means includes two coil springs into which the sending side optically functional section and the receiving side optically functional section are inserted.

6. The optical connector of claim 1, wherein the urging means is provided on the shield cover.

7. The optical connector of claim 1, wherein the light emitting element and the light receiving element are held in an element holder, the element holder being placed in the shield cover, and the urging means is provided on the element holder.

8. The optical connector of claim 1, wherein the urging means includes two coil springs into which the sending side optically functional section and the receiving side optically functional section are inserted.

9. An optical connector, comprising:
a shield cover holding a light emitting element and a light receiving element;
a light guide including a sending side optically functional section optically connecting the light emitting element and a transmission optical fiber and a receiving side optically functional section optically connecting the light receiving element and a reception optical fiber, the light guide being made of light-transmitting synthetic resin;
a receptacle body into which the light guide is inserted, the receptacle body being slidable with respect to the shield cover to mate with the shield cover; and
an urging means urging the light guide in a direction in which the light guide is inserted into the receptacle body when the receptacle body mates with the shield cover;
wherein an end of the sending side optically functional section faces the light emitting element and an end of the receiving side optically functional section of the light guide faces the light receiving element when the receptacle body has mated with the shield cover;
wherein the urging means urges the light guide in a direction in which the sending side optically functional section and the receiving side optically functional section move away from the light emitting element and the light receiving element, respectively, when the receptacle body has mated with the shield cover; and
wherein the urging means is provided on the light guide.

10. An optical connector comprising:
a shield cover holding a light emitting element and a light receiving element;
a light guide including a sending side optically functional section optically connecting the light emitting element and a transmission optical fiber and a receiving side optically functional section optically connecting the light receiving element and a reception optical fiber, the light guide being made of light-transmitting synthetic resin;
a receptacle body into which the light guide is inserted, the receptacle body being slidable with respect to the shield cover to mate with the shield cover; and
an urging means urging the light guide in a direction in which the light guide is inserted into the receptacle body when the receptacle body mates with the shield cover;
wherein an end of the sending side optically functional section faces the light emitting element and an end of the receiving side optically functional section of the light guide faces the light receiving element when the receptacle body has mated with the shield cover; and
wherein the urging means is provided on the light guide.

* * * * *